United States Patent [19]

Mitsui et al.

[11] Patent Number: 4,472,126
[45] Date of Patent: Sep. 18, 1984

[54] APPARATUS FOR MANUFACTURING REINFORCED HOSES

[75] Inventors: Kenichi Mitsui, Ichinomiya; Shoji Murakawa, Inazawa, both of Japan

[73] Assignee: Toyoda Gosei Co., Ltd., Haruhimura, Japan

[21] Appl. No.: 449,005

[22] PCT Filed: Jul. 13, 1982

[86] PCT No.: PCT/JP82/00263
§ 371 Date: Nov. 30, 1982
§ 102(e) Date: Nov. 30, 1982

[87] PCT Pub. No.: WO83/00305
PCT Pub. Date: Feb. 3, 1983

[30] Foreign Application Priority Data
Jul. 17, 1981 [JP] Japan ................................. 56-112829

[51] Int. Cl.³ ...................... B29C 27/26; B29D 23/05
[52] U.S. Cl. .................................... 425/114; 156/149; 156/393; 156/431; 156/432; 264/103; 264/173; 264/174; 425/133.1; 425/462
[58] Field of Search ...................... 425/113, 114, 133.1, 425/462, 467; 264/173, 174, 103; 156/149, 393, 431, 432

[56] References Cited

U.S. PATENT DOCUMENTS

| | | | |
|---|---|---|---|
| 2,563,397 | 8/1951 | Colombo | 425/114 |
| 2,800,683 | 7/1957 | Teichmann | 425/114 |
| 3,004,286 | 10/1961 | Klein | 425/114 |
| 3,289,251 | 12/1966 | Daubenfeld | 425/114 |
| 3,303,251 | 2/1967 | Heider et al. | 425/114 |
| 3,375,550 | 4/1968 | Klein | 425/114 |
| 3,405,426 | 10/1968 | Donald | 425/114 |
| 3,961,873 | 6/1976 | Brown | 425/114 |
| 4,202,718 | 5/1980 | Mizutani et al. | 156/431 |

FOREIGN PATENT DOCUMENTS

| | | | |
|---|---|---|---|
| 2153667 | 5/1973 | Fed. Rep. of Germany | 425/113 |
| 5179187 | 12/1974 | Japan . | |
| 53-79974 | 7/1978 | Japan | 156/432 |
| 1038060 | 8/1966 | United Kingdom | 264/173 |
| 515650 | 10/1976 | U.S.S.R. | 425/467 |

Primary Examiner—Jeffery R. Thurlow
Attorney, Agent, or Firm—Cushman, Darby & Cushman

[57] ABSTRACT

In an apparatus for manufacturing reinforced hoses, a reinforced layer forming device is arranged concentric with material efflux port of an outer tube extruder and an inner tube extruder so that inner tube formation, the reinforcing layer formation and the outer tube extruding can be performed continuously and nearly at the same time on a torpedo projected beyond the top end of an inner die (2) of the inner tube extruder (1). In order to obtain the reinforcing layer of uniform spiral structure stably, a spiral device (21) as a reinforcing layer forming device has an inner spinner (25) and an outer spinner (26), each having conical frustum form, and top end portions of the inner and outer spinners are provided with a plurality of thread holes (G1, G2) and inserted in a gap between the intermediate die (12) and the inner die (2), and the inner and outer spinners can be rotated integrally with inner and outer bobbin carriers respectively.

2 Claims, 6 Drawing Figures

APPARATUS FOR MANUFACTURING REINFORCED HOSES

DESCRIPTION

TECHNICAL FIELD

This invention relates to an apparatus for manufacturing reinforced hoses, in which a torpedo is formed by being projected beyond the top end of an inner die of an inner tube extruder, an outer tube extruder has an outer tube material efflux port which is constituted by an intermediate die and an outer die and disposed close to the inner die and outside the torpedo, and means for forming a reinforced layer is arranged so as to lead the reinforcing thread out of a gap between the intermediate die and the inner die and throw onto an inner tube just extruded, and more particularly to an apparatus applied to manufacturing a reinforced hose with reinforced layer of spiral structure.

BACKGROUND ART

Such an apparatus for manufacturing reinforced hoses as above described was already filed for patent by the applicant of this invention and therefore known (refer to Japanese patent laid-open No. 51-79187). The apparatus for manufacturing reinforced hoses in known art is intended to manufacture a reinforced hose with a reinforcing layer of stranded structure, and the inventors tried to apply it for manufacturing a reinforced hose with a reinforcing layer of spiral structure. In this case, spiral structure means that seen in a reinforcing layer B as shown in FIG. 6 wherein inner reinforcing thread F1 and outer reinforcing thread F2 of plural numbers respectively are wound in spiral on an inner tube 6 in opposite directions with each other.

When the reinforcing layer of spiral structure is formed on the extruded inner tube, however, since the spiral device as a reinforcing layer forming device is usually rotated at such a high speed as 180~200 rpm (at a stranding machine, usually 30~55 rpm), overrunning of the reinforcing thread on account of the centrifugal force, interference of the top end of the inner die with the reinforcing thread, contacting between the inner and outer reinforcing threads, vibration transmitted from the extruder or the bobbin carrier to the thread and the like cause dispersion in the winding state of the reinforcing thread, thereby it is difficult to obtain uniform spiral structure stably, that is, to obtain a reinforced hose having stable quality (particularly being excellent in high-pressure resistance).

In view of above described aspects, an object of this invention is to provide an apparatus for manufacturing reinforced hoses, in which a reinforcing layer of uniform spiral structure can be formed stably.

DISCLOSURE OF INVENTION

This invention provides an apparatus for manufacturing reinforced hoses, which comprises a reinforcing layer forming device arranged in concentric with material efflux port of an outer tube extruder and an inner tube extruder, so that extruding of the inner tube, forming of the reinforcing layer and extruding of the outer tube can be performed continuously and approximately at the same time on a torpedo being projected beyond the top end of an inner die of the inner tube extruder, wherein the reinforcing layer forming device is constituted in a spiral device, and an outer spinner and an inner spinner, both formed in a truncated cone, are inserted at respective top ends with a plurality of thread holes through a gap between the outer tube extruding die and the inner tube extruding die and arranged rotatably in integral respectively with outer and inner bobbin carriers of the spiral device. In this constitution, the reinforcing layer of uniform spiral structure can be stably formed at manufacturing the reinforced hoses, a reinforced hose requiring strict quality (excellent high-pressure resistant property), such as water hose of small diameter for vehicles, can be manufactured continuously and at high speed.

BRIEF DESCRIPTION OF THE DRAWINGS

The drawings show preferable embodiments of this invention.

BEST MODE FOR CARRYING OUT THE INVENTION

An embodiment of this invention will now be described referring to the accompanying.

Figure 1:
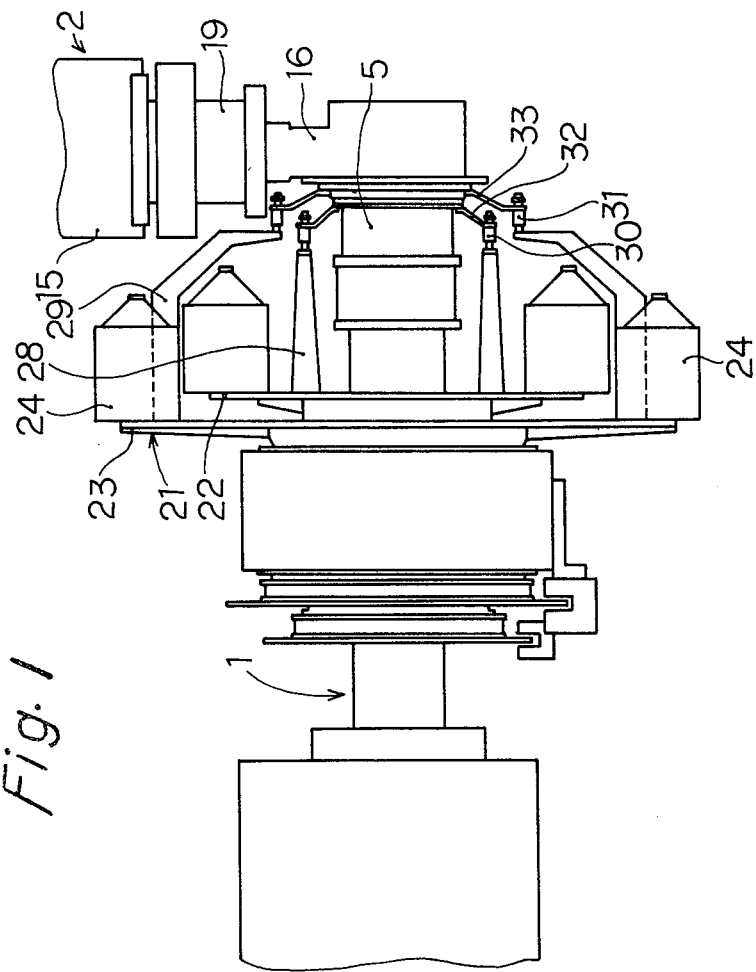
FIG. 1 is a plan view illustrating whole arrangement of an apparatus for manufacturing reinforced hoses.
Figure 2:
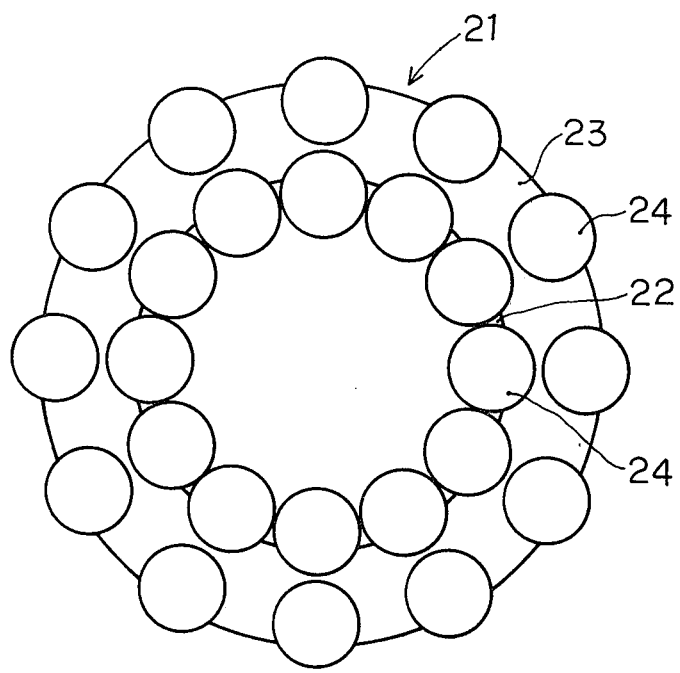
FIG. 2 is a view illustrating arrangement of bobbin carrier of a spiral device.
Figure 3:
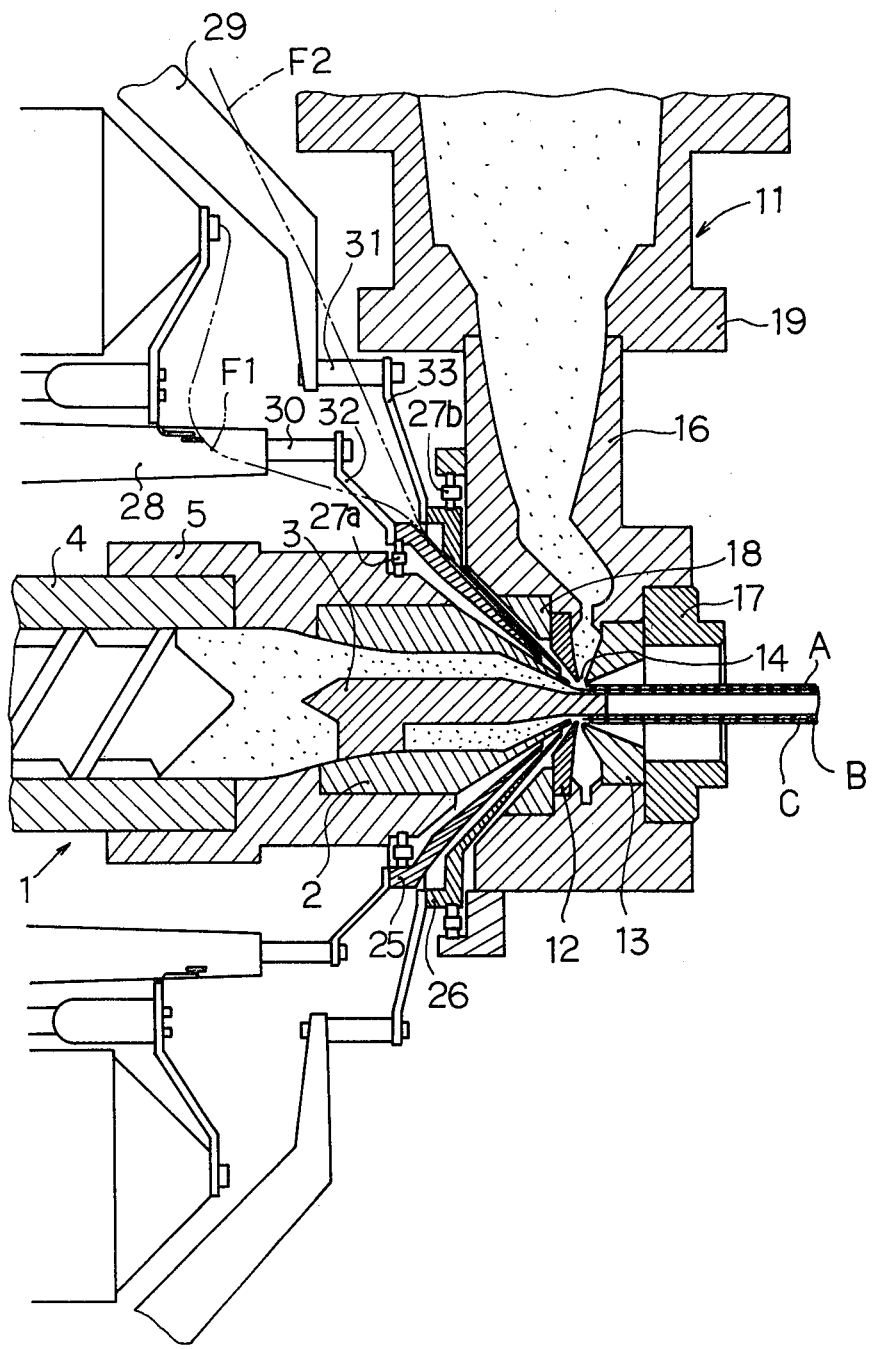
FIG. 3 is a plan view in section of main part of the apparatus for manufacturing reinforced hoses.

As shown in FIGS. 1~3, an inner tube extruder 1 has an inner die 2 and a torpedo 3 is projected beyond the top end of the inner die 2. An outer tube extruder 11 has an outer tube material efflux port 14 which is constituted by an intermediate die 12 and an outer die 13 and disposed close to the inner die 2 and outside the torpedo 3. A spiral device 21 as a reinforcing layer forming device is so arranged that reinforcing threads F1, F2 are led though a gap between the intermediate die 12 and the inner die 2 and thrown onto an inner tube A just extruded. Of course, the spiral device 21 is arranged concentric with material efflux port of the outer tube extruder 11 and the inner tube extruder 1.

In the inner tube extruder 1, the inner die 2 together with the torpedo 3 is attached to top end of an extruding head 5 mounted on top end of an extruding barrel 4. In the outer tube extruder 11, the intermediate die 12 and the outer die 13 are attached to an extruding head 16 mounted through an adapter 19 on an extruding barrel 15 using an outer die pushing member 17 and an intermediate die pushing member 18, respectively. The spiral device 21 is composed of an inner bobbin carrier 22 and an outer bobbin carrier 23 which are rotated in opposite directions with each other, and each of the bobbin carriers is provided with twelve bobbins 24 so as to lead the reinforcing thread F1, F2.

In the apparatus as above constituted, an inner spinner 25 and an outer spinner 26, each having conical frustum form, are attached respectively to the extruding head 5 of the inner tube extruder and the extruding head 16 of the outer tube extruder through bearing 27a, 27b, respectively. Each top end of the spinners 25, 26 is provided with a plurality of thread holes G1, G2 spaced at regular intervals in radial arrangement, and is inserted between the intermediate die 12 and the inner die 2. Base portion of the spinners 25, 26 is connected to the inner bobbin carrier 22 and the outer bobbin carrier 23 through driving arms 28, 29, each in two pieces, shafts 30, 31 and spinner arms 32, 33, and can be rotated integrally with respective bobbin carriers.

Use manner of the above mentioned apparatus for manufacturing reinforced hoses will now be described.

Inner tube material within the extruding barrel 4 of the inner tube extruder is extruded through an orifice 7 constituted by the torpedo 3 and the inner die 2 thereby an inner tube A is formed. On the inner tube A just extruded is formed a reinforcing layer B of spiral structure by throwing the reinforcing thread F1, F2 led form the bobbins 24 of the spiral device, and then immediately outer tube material within the extruding barrel 15 of the outer tube extruder is extruded through the outer tube material efflux port 14 thereby an outer tube C is formed.

Since formation of the reinforcing layer and the outer tube is effected on the torpedo 3 projected beyond the top end of the inner die 2 the inner tube A is not crushed, and formation of the outer tube C on the inner tube A just extruded results in good adhesive property between the inner tube A and the outer tube C.

Figure 4:
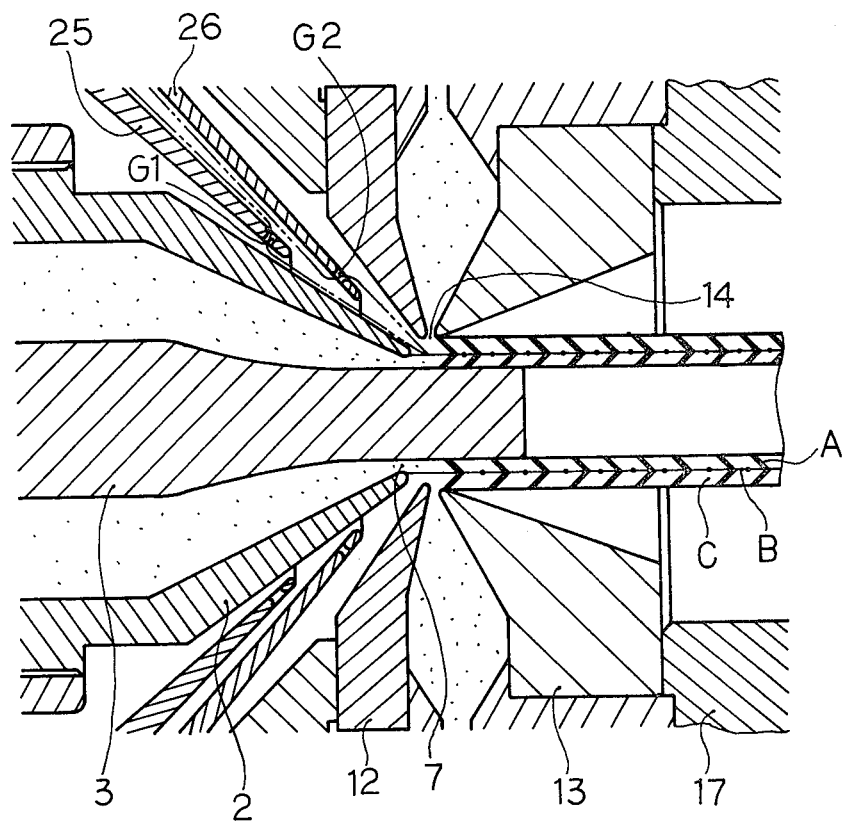
FIG. 4 is an enlarged sectional view of substance extruding part.

The reinforcing threads F1, F2 led through the bobbins 24 of the spiral device, as shown in FIGS. 3~4, are guided by the thread holes G1, G2 spaced at regular intervals in radial arrangement at top end portion of the inner spinner 25 and the outer spinner 26 respectively, and then led through a gap between the inner die 2 and the intermediate die 12 onto the inner tube A. Accordingly, even the high-speed rotation of the spiral device the reinforcing threads F1, F2 are distributed radially in equal spacing by the thread holes G1, G2 at the reinforcing layer B forming portion close to outside of the inner tube and led onto the inner tube A, thereby runaway of the reinforcing thread on account of centrifugal force is inhibited and contacting between the inner and outer reinforcing threads and interference of the top end of the inner die with the reinforcing thread is prevented, vibration from the bobbin carrier or the like is inhibited in forward direction from the thread holes G1, G2 therefore the reinforcing thread is supplied to the inner tube A at the correct position and the reinforcing layer of uniform spiral structure can be formed.

Figure 5:
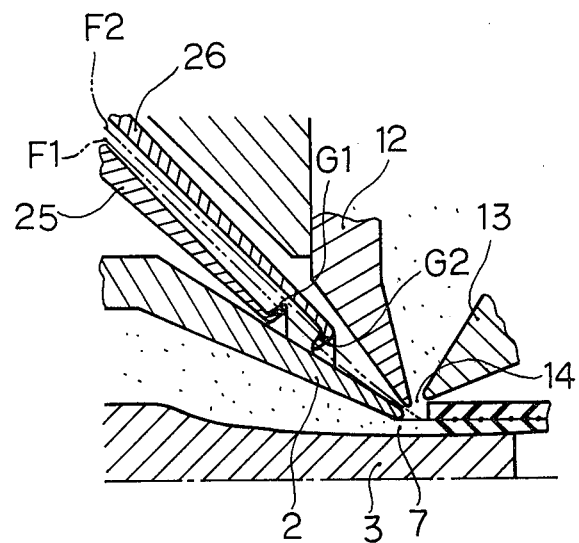
FIG. 5 is enlarged sectional view of modification of FIG. 4 using a spinner.
Figure 6:
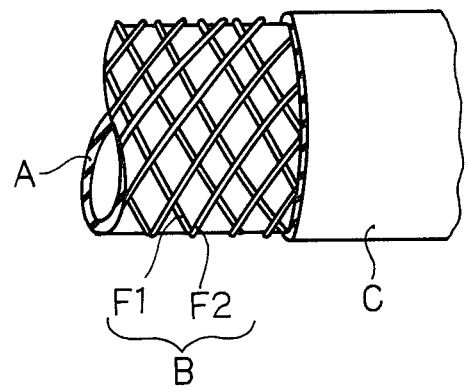
FIG. 6 a front view partly cut-away of reinforced hose having a reinforcing layer of spiral structure.

The inner spinner 25 and the outer spinner 26, as shown in FIG. 5, may be so constituted that top end portions are bent outward and inward, and the thread holes G1, G2 are formed on the bent portions and spaced at regular intervals in arrangement. In such constitution, since feed direction of the reinforcing thread and axial direction of the thread hole coincide, the reinforcing thread is not abraded at the edge of the thread holes G1, G2 even using the reinforcing thread coated by adhesive agent.

We claim:

1. An apparatus for manufacturing reinforced hoses which comprises:

a fixed torpedo member for forming a hollow interior within a hose;

an inner tube extruder positioned about the torpedo member including an inner die for forming an inner tube structure wherein the exterior end of the torpedo projects beyond the exterior end of said inner die;

an outer tube extruder positioned about the torpedo member having an outlet positioned downstream from said inner tube extruder so that a gap is formed therebetween, said outer tube extruder outlet including an intermediate die and an outer die for forming an outer tube over the just extruded inner tube;

a reinforcing layer forming device including an inner spinner means and an outer spinner means for forming a reinforcing layer in the hose wherein the outer end portions of said inner and outer spinner means each include a rotating conical frustum form positioned about said inner die and a plurality of thread holes spaced at regular intervals in radial arrangement adjacent the outer end of said conical frustum forms so that reinforcing thread can be inserted in said gap between the intermediate and inner dies, said inner and outer spinner means each including separate bobbin means for supplying thread, said bobbin means being rotated integrally with the inner and outer spinner means, respectively, so that reinforcing threads are led through the gap between the intermediate and inner dies, and positioned on the inner tube in manner so as to be covered thereafter with the outer tube.

2. An apparatus for manufacturing reinforced hoses according to claim 1, wheren the exterior end portions of said conical frustum form in each of said inner and the outer spinner means are bent outwardly and inwardly, respectively, and the thread holes are formed in the bent portions and spaced at regular intervals in radial arrangement therearound.

* * * * *